R. C. HAMILTON
HORSESHOE.
APPLICATION FILED MAR. 27, 1917.
1,255,092.
Patented Jan. 29, 1918.
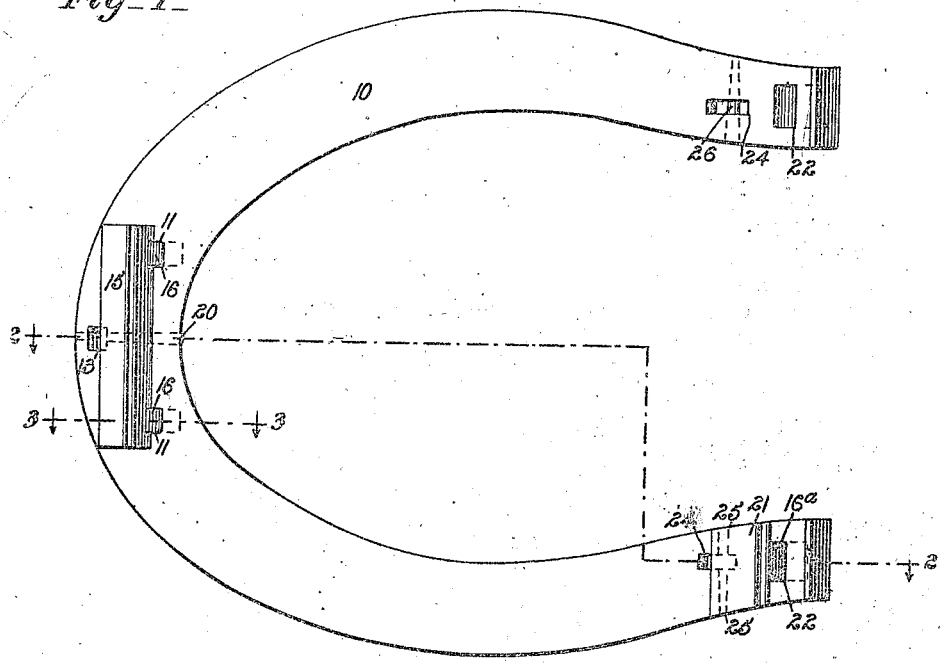
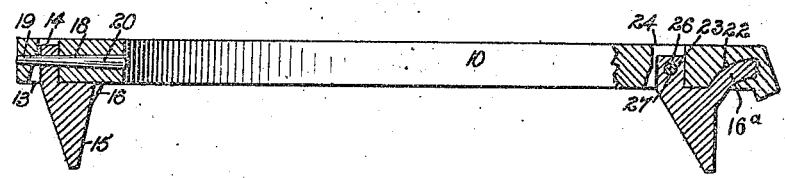
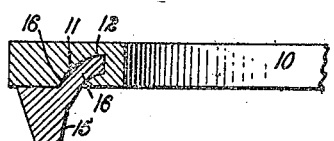
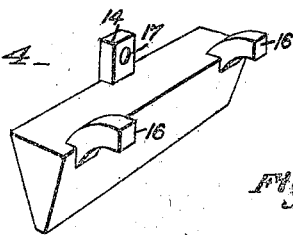
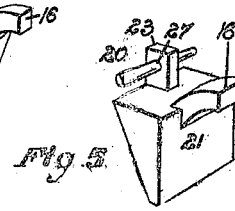
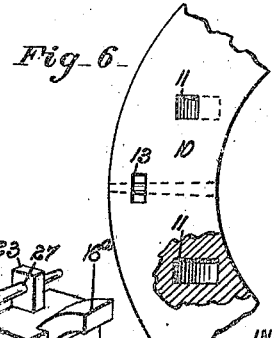
WITNESSES
INVENTOR
R. C. Hamilton
BY
ATTORNEYS

UNITED STATES PATENT OFFICE.

ROBERT CYRIL HAMILTON, OF SANGUDO, ALBERTA, CANADA.

HORSESHOE.

1,255,092.     Specification of Letters Patent.     Patented Jan. 29, 1918.

Application filed March 27, 1917. Serial No. 157,689.

*To all whom it may concern:*

Be it known that I, ROBERT C. HAMILTON, a subject of the King of Great Britain, and a resident of Sangudo, Alberta, Dominion of Canada, have invented a new and Improved Horseshoe, of which the following is a full, clear, and exact description.

My invention has for its object to provide a horseshoe having a detachable calk, there being an angular opening in the bottom of the horseshoe, and another opening spaced therefrom so that an angular projection on the calk may be inserted in the angular opening, and the calk may be turned to move the projection home, thereby disposing a second projection on the calk in position for insertion in the second opening in the horseshoe, the calk being in position and the angular projection fitting the angular opening snugly when the second projection is moved home in the second mentioned opening. When the two projections on the calk are in position in the openings in the horseshoe, one of the projections is secured to the horseshoe to hold the calk in place.

Additional objects of the invention will appear in the following specification, in which the preferred form of the invention is disclosed.

In the drawings similar reference characters denote similar parts in all the views, in which—

Figure 1 is an inverted plan view of a horseshoe provided with my invention;

Fig. 2 is a sectional view on the line 2—2 of Fig. 1;

Fig. 3 is a sectional view on the line 3—3 of Fig. 1;

Fig. 4 is a perspective view of the front calk;

Fig. 5 is a perspective view of one of the rear calks; and

Fig. 6 is a fragmentary sectional view showing the under side of the front of the horseshoe.

By referring to the drawings, it will be seen that the horseshoe 10 may be constructed in the usual manner, the front of the horseshoe at its underside having two openings 11 which are spaced apart and which extend upwardly and rearwardly, as best shown in Fig. 3. I prefer to make these openings 11 angular in form so that after they extend upwardly and rearwardly a predetermined distance from the bottom of the horseshoe, they will be disposed rearwardly as indicated at 12. These openings 11 with their rear ends 12, are two in number, as has been stated. Disposed in front of a point between the openings 11 there is an opening 13 which preferably is disposed through the top of the horseshoe, as shown in Fig. 2 of the drawings. This opening 13 is provided for receiving a projection or lug 14 on a calk 15 after rearwardly extending lugs or projections 16 are seated in the openings 11. The said lugs or projections 16 extend upwardly and rearwardly for a distance, and then rearwardly, so that when they are introduced into the openings 11, the ends of the lugs or projections will fit in the rear ends 12 of the openings 11 when the lug or projection 14 on the calk 15 is inserted in the opening 13. There is a horizontally extending orifice 17 in the lug or projection 14, this orifice 17 registering with tapering orifices 18 and 19 in the horseshoe 10 when the lug 14 is in position in the opening 13. A tapered pin 20 is then introduced in the orifice 18, and is pushed through the orifice 17 and into the orifice 19, this means being provided for securing the calk 15 in position. It will be understood that when the pin 20 is withdrawn, the calk 15 may be removed and another calk may be substituted therefor.

Calks 21 at the rear of the horseshoe are constructed in a similar manner, but each of the calks 21 has only one rearwardly extending lug or projection 16ª, which fits an opening 22 which extends upwardly and then rearwardly, as illustrated in Fig. 2 of the drawings. A lug or projection 23 on the rear calk 21 fits in an opening 24 disposed in front of the opening 22, there being orifices 25 in the horseshoe 10 at the sides of the opening 24, so that a pin 26 may be disposed in one of the orifices 25 through an orifice 27 in the lug or projection 23, and through the other orifice 25. This means is provided for securing each of the rear calks 21 in place.

Having thus described my invention, I claim as new and desire to secure by Letters Patent:

A horse shoe having two openings in its bottom one behind the other, one of the openings being curved upwardly and away from the other opening, a calk having two upwardly extending projections one of the projections being straight and the other being curved away from the straight projection, the projections being of the same size as the openings in the horse shoe so that the curved projection may be introduced into the curved opening in the horse shoe and the calk may be turned to move the straight projection into the other opening, the curved projection fitting the curved opening snugly and the straight projection fitting the other opening snugly when the calk is moved into normal position, and means to secure one of the projections to the horse shoe.

ROBERT CYRIL HAMILTON.